United States Patent [19]
Ziegler

[11] Patent Number: 4,951,087
[45] Date of Patent: Aug. 21, 1990

[54] ALIGNMENT TECHNIQUE FOR A PHOTOGRAPHIC ENLARGER

[76] Inventor: William R. Ziegler, 417 Shirley Way, Menlo Park, Calif. 94025

[21] Appl. No.: 228,991

[22] Filed: Aug. 5, 1988

[51] Int. Cl.⁵ .............................................. G03B 27/52
[52] U.S. Cl. .......................................... 355/43; 355/72
[58] Field of Search ....................... 355/18, 39, 44, 43, 355/52, 61, 72, 73, 74, 75, 76, 77

[56] References Cited
U.S. PATENT DOCUMENTS

| | | | |
|---|---|---|---|
| 2,285,768 | 6/1942 | Drucker | 355/18 |
| 2,701,501 | 2/1955 | Cuny | 356/153 |
| 3,432,233 | 3/1969 | Kauffman | 355/72 |
| 3,825,938 | 7/1974 | Koch | 355/52 |
| 4,733,257 | 3/1988 | Ziegler | 354/189 |

OTHER PUBLICATIONS
Hasselblad, "Linear Mirror Unit" (Instructions).

Primary Examiner—Brian W. Brown
Attorney, Agent, or Firm—Flehr, Hohbach, Test, Albritton & Herbert

[57] ABSTRACT

An alignment arrangement for use with a photograph enlarger apparatus is disclosed herein. The enlarger apparatus includes an enlarger head assembly, an enlarger easel and means for supporting the enlarger head assembly above the easel. The alignment arrangement includes a first mirror member which is configured to lie on the enlarger easel and a second mirror member which is connected to the enlarger head assembly, at a particular location for aligning the camera with the easel in a specific way. There is also disclosed herein a specific assembly for adjusting the position of the easel itself.

41 Claims, 3 Drawing Sheets

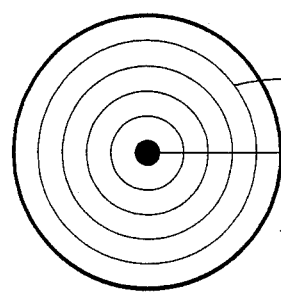
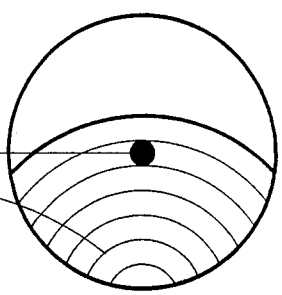
FIGURE 2A  FIGURE 2B
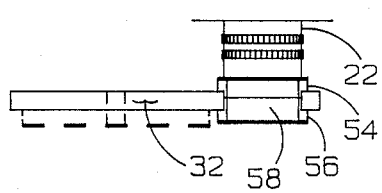
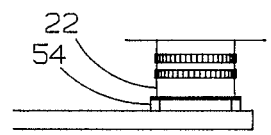
FIGURE 3  FIGURE 4
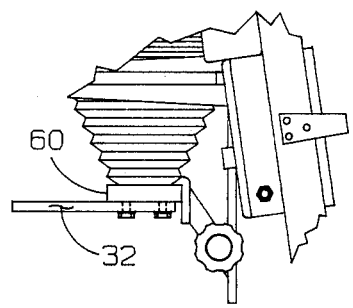
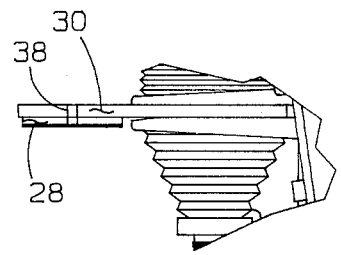
FIGURE 5  FIGURE 6

4,951,087

ALIGNMENT TECHNIQUE FOR A PHOTOGRAPHIC ENLARGER

The present invention relates generally to alignment techniques for photographic equipment, and more particularly to an alignment technique for use with a photograph enlarger apparatus.

The present invention is an extension of the principles relied upon in Applicant's U.S. Pat. 4,733,257, which is incorporated herein by reference. In that patent, a technique for aligning (making parallel) the lens and film planes of a view camera is disclosed. That technique uses a pair of mirror members, each having a mirror body including its own mirrored surface. A first one of the mirror members is configured to fit within the film standard of the view camera in lieu of a film holder so that its mirrored surface faces the lens standard of the camera and coincides or substantially coincides with the camera's film plane. The second mirror member is configured to temporarily replace the camera's lens and lens board which is within its lens standard so that the second mirrored surface faces the film standard and first mirrored surface and coincides with the camera's lens plane. In addition, the second mirror member includes a view hole through its mirror body and mirrored surface so that the two mirrored surfaces can be viewed from outside the lens standard. At the same time, certain specific indicia is provided on at least one of the mirrored surfaces such that when the mirrored surfaces are viewed through the view hole of the second mirror member from outside the lens standard, the indicia will take only one of many different forms if the two mirrored forms are parallel. In this way, as the indicia is viewed, the lens and film standards can be adjusted to cause the indicia to take on the one particular form, thereby insuring that the mirrored surfaces, and therefore the lens and film planes, are indeed parallel.

Applicant has not only found it important to align view cameras in the manner described in his U.S. Pat. No. 4,733,257, but he has also found it to be quite important to align accurately (make parallel) certain planes of an enlarger apparatus. More specifically, the typical photograph enlarger apparatus includes an enlarger head assembly, an enlarger easel, and means for supporting the enlarger head assembly above the plane of the easel. The enlarger head assembly itself includes a lens defining a lens plane and a frame for supporting a negative in a negative plane above the lens. Applicant has found it to be quite important to insure that both the lens plane and the negative plane are parallel with the easel. However, Applicant has also found that the alignment arrangement described in his United States Patent mentioned above is not by itself sufficient to align a photograph enlarger apparatus in this way.

In view of the foregoing, it is an object of the present invention to provide an accurate and reliable alignment technique to check the parallel relationship between the lens and/or negative planes of a camera assembly forming part of an overall photograph enlarger apparatus and the plane of the easel which is intended to support photographic paper Another object of this invention is to provide an alignment technique of the last mentioned type which is also uncomplicated and economical, and can be readily incorporated into an existing photograph enlarger apparatus.

Still another object of this invention is to provide an alignment technique that does not require making any modifications to an existing photograph enlarger apparatus, but rather uses additional components that are compatible with the apparatus.

A further object of the present invention is to provide an arrangement for adjusting the plane of the easel forming part of the last-mentioned alignment apparatus in order to make the plane parallel with the lens and/or negative planes of the camera assembly.

As will be discussed in more detail hereinafter, the alignment arrangement disclosed herein includes first and second mirror members. The first mirror member has a mirror body including a mirrored surface and is configured to lie on an easel forming part of the overall photograph enlarger apparatus such that its mirrored surface faces the negative support frame of the enlarger head assembly which also forms part of the apparatus. The second mirror member also has a mirror body including a mirrored surface and a view hole through its mirror body and mirrored surface. This mirror member is part of an overall means configured to replace temporarily the negative support frame of the enlarger head assembly so that the second mirrored surface faces the easel and the first mirrored surface, and so that both mirrored surfaces can be viewed through the view hole in the second mirror member. Indicia is provided on at least one of the mirrored surfaces such that when the mirrored surfaces are viewed through the view hole, the indicia will take only one of many different forms if the two mirrored surfaces are parallel, whereby the means including the second mirror member and/or the easel and first mirror member can be adjusted to provide the one form in order to insure that the negative support frame is parallel with the easel.

In an actual working embodiment of the alignment arrangement just recited, means are provided for supporting the second mirror member on the lens plane of the enlarger head assembly forming part of the overall enlarger apparatus, in confronting relationship with the first mirror member. In this way, the two mirror members can be used to insure that the lens plane is parallel with the easel also.

As will also be discussed in more detail hereinafter, the arrangement for adjusting the plane of the easel includes a pair of spaced apart bars and means for adjusting the position of each end of each bar on a baseboard. These bars support the easel below the enlarger head assembly forming part of the overall photograph enlarger apparatus. In this way, the easel itself can be leveled during the alignment technique described above.

The various inventive aspects of the present application will be described in more detail hereinafter in conjunction with the drawings, wherein:

FIG. 1 is an enlarged side elevational view of a photographic enlarger apparatus and an alignment arrangement in combination therewith.

FIGS. 2A and 2B diagrammatically illustrate the way in which the alignment arrangement of FIG. 1 operates;

FIG. 3 is an enlarged side elevational view of part of the enlarger apparatus and alignment arrangement of FIG. 1;

FIG. 4 is a view similar to FIG. 3, but showing a modified version of the components illustrated in FIG. 3;

FIG. 5 is a view similar to FIGS. 3 and 4, showing still a further modified version of the components of FIG. 3;

FIG. 6 is a side elevational view showing a further modification of the alignment arrangement of FIG. 1;

Figure 1:
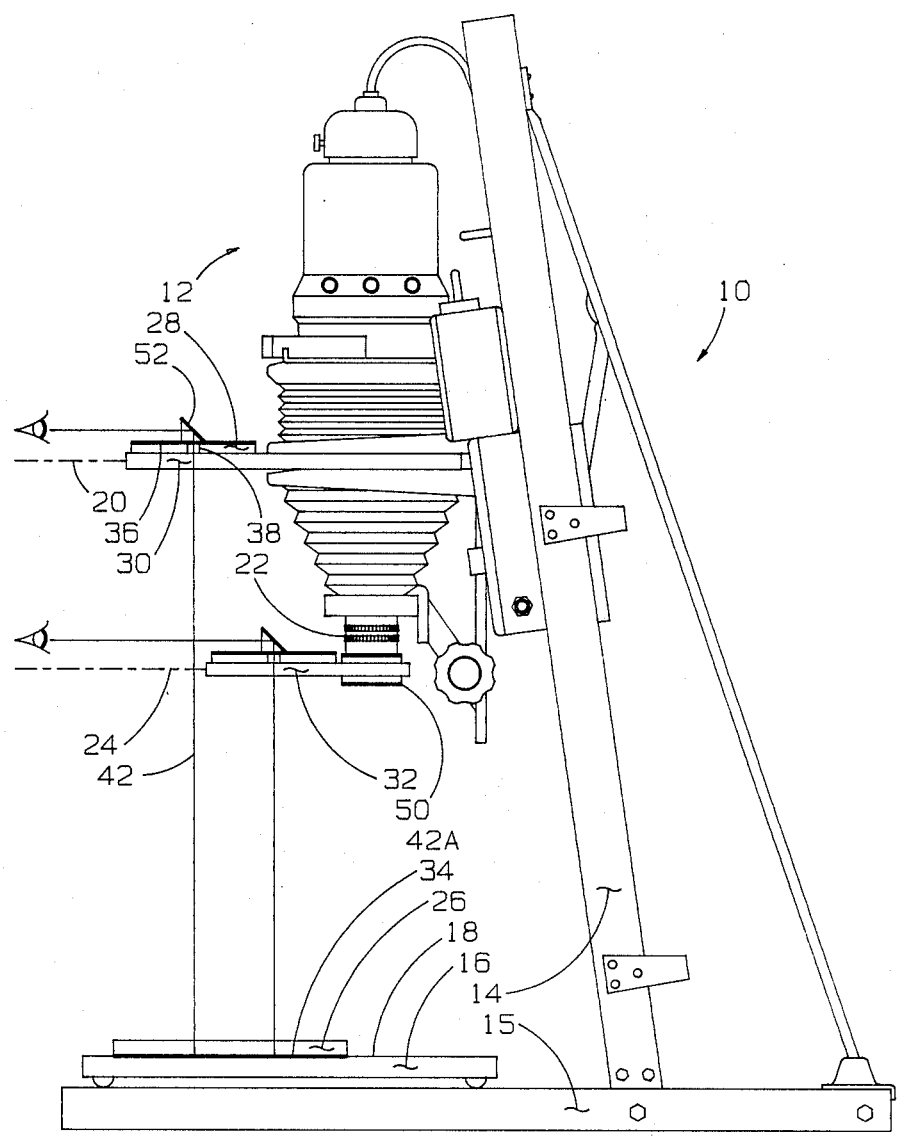

Turning now to the drawings, wherein like components are designated by like reference numbers throughout the various figures, attention is first directed to FIG. 1. This figure illustrates a photograph enlarger apparatus 12 of the conventional type, for example, one manufactured by Omega under the trade name D5 by the Bessler company. As seen in FIG. 1, this enlarger includes an enlarger head assembly 12 supported on an upright or stand 14 directly above a baseboard 15 which supports an easel 16 having a horizontally extending, upwardly facing easel surface 18. The enlarger head assembly 12 includes, among other components, a removable frame for supporting a negative to be enlarged within what will be referred to as a negative plane. In FIG. 1, the negative support frame is not shown as it has been removed from the enlarger head assembly. However, the negative plane is illustrated by dotted lines at 20. The enlarger head assembly 12 also includes a lens 22 defining a lens plane 24 indicated by dotted lines in FIG. 1. In order to insure that apparatus 10 makes high quality enlargements, it is important that negative plane 20 and lens plane 24 be truly parallel with easel surface 18. In accordance with one embodiment of the present invention, an arrangement of mirror members and mirror member supports is used to achieve this end.

More specifically, as will be described in detail hereinafter, one particular embodiment of this alignment arrangement includes a first mirror member 26, a second mirror member 28, a plate 30 for supporting mirror member 28 in or parallel to negative plane 20, and a plate 32 for supporting mirror member 28 in lens plane 24.

As best illustrated in FIG. 1, mirror member 26 comprises a mirror body having flat mirrored surface 34. This mirror member is placed on easel 16 so that mirrored surface 34 faces upward under the enlarger head assembly. At the same time, plate 30 which is, for example, a clear glass plate or other such transparent support member, is disposed within the space vacated by the negative support frame of the enlarger head and therefore extends in negative plane 20. This transparent plate 30 supports mirror member 28 on its top surface, directly over and in vertical alignment with mirror member 26. Mirror member 28 has a mirror body including a downwardly facing mirrored surface 36 and a view hole 38 through its mirror body and mirrored surface. While not shown, a circle is located on mirror member 28 concentrically around view hole 38 as in the corresponding mirror in U.S. Pat. No. 4,733,257. With mirror members 26 and 28 in this positional relationship to one another, both mirrored surfaces can be viewed through view hole 38, above mirror member 28, as indicated by the view line 42. If easel surface 18 and negative plane 20 are truly parallel to one another, the view hole 38 of mirror member 28 will appear as a dot 44 in the center of a series of concentric circles 46, as illustrated in FIG. 2A. On the other hand, if surface 18 and plane 20 are not truly parallel, circle 40 will appear as a series of arcs 48 as illustrated in FIG. 2B. Thus, if easel surface 18 and negative plane 20 are not truly parallel, as observed through view hole 38, it is only necessary to adjust negative plane 20 and/or easel 16 until concentric circles 46 appear around dot 44. This procedure is discussed in more detail in Pat. No. 4,733,257 which, as indicated above, is incorporated herein by reference.

Negative plane 20 can be adjusted in any suitable and readily providable manner, depending on the particular enlarger. It may also be possible to adjust the entire enlarger head assembly 12 and support upright 14 relative to easel 16 by means of shims or the like. As will be seen hereinafter in conjunction with FIGS. 7-9, an assembly is provided for adjusting the easel itself.

The discussion immediately above related to the way in which negative plane 20 is made parallel with easel surface 18. Mirror member 28 may also be supported on plate 32 directly over mirror member 26 in order to make lens plane 24 parallel with the easel surface. To this end, plate member 32 is also transparent, for example a clear glass plate, and, as indicated above, it is supported in lens plane 24. Means generally indicated at 50 is provided for connecting plate member 32 to lens 22 of enlarger head assembly 12 in a manner to be described below.

From the foregoing, it should be apparent that the same mirror member 28 can be moved between plates 30 and 32 and the mirror member 26 can be large enough to cover both view lines 42 and 42a in order to align negative and lens planes 20 and 24, respectively, with easel surface 18. In both cases, because enlarger head assembly 12 is located a relatively large distance above easel 16, it may be difficult for the observer to position himself directly over plates 30 and 32. Accordingly, the overall alignment arrangement may include a prism 52 or small mirror set at an angle which can be placed on mirror member 28 directly over view hole 38. As a result, the observer can look down through the view hole and along viewing line 42 from one side of the prism, as illustrated in FIG. 1. In this way, the observer does not have to position himself directly above mirror member 28.

As indicated above, means 50 is provided for connecting plate 32 to lens 22. FIG. 3 illustrates a pair of cooperating adaptor and filter retaining rings 54 and 56, respectively, serving as means 50. Adaptor ring 54 connects directly to the lens in a known manner, and filter retaining ring 56 connects to the adaptor ring through a cooperating opening 58 in plate 32. Using standard, commercially available adaptor and filter rings, for example, Tiffen rings, such rings can only accommodate a 1/16" thick glass plate 32. However, the filter ring can be readily customized to accommodate a ⅛" thick glass plate.

FIG. 4 illustrates a modified version of connecting means 50. This version consists of adaptor ring 54 which is bonded to the top side of plate 32. In this way, the plate does not require a cooperating opening 58 and the connecting means does not include the filter retaining ring 56.

FIG. 5 illustrates still another means for maintaining plate 32 in lens plane 24. In this version, the lens itself is removed and plate 32 is bolted or otherwise secured to the lens board 60 forming part of the overall enlarger head assembly. In this case, neither an adaptor ring nor a filter retaining ring is necessary and plate 32 can be thicker than ⅛" and does not have to include an opening 58.

Both of the plates 30 and 32 forming part of the alignment arrangement discussed above were described as being constructed of transparent glass. It is possible to use opaque plates, for example stainless steel plates. In this case, a mirror member corresponding to member 28 would have to be connected, either fixedly or removably, to the underside of the plate, as illustrated by dotted lines in FIG. 3 (in the case of plate 32) and in FIG. 6 by solid lines (in the case of plate 30). In both cases, the plate would have to have an opening in alignment with the view hole. The opaque plate illustrated in FIG. 6 is indicated by reference number 30' to distinguish it from plate 30. This plate includes its own view hole 38'. The mirror member 28 could be fixedly bonded to the underside of plate 30', in which case a second mirror member would be required for a plate corresponding to plate 32. On the other hand, the mirror member 28 could be provided with a magnetic back surface or double sided tape so that the mirror member could be removably connected to the underside of plate member 30'.

In addition to the foregoing, mirror member 28, whether on top of the supporting plate or attached to its underside, was described as including a circle concentrically disposed around view hole 38. As in Applicant's issued Patent, it is to be understood that either the mirror member 26 or mirror member 28, or both, could include indicia such that when the mirrored surfaces are viewed through the view hole, the indicia will take on only one of many different forms if the two mirrored surfaces are parallel. In a preferred and actual working embodiment, a concentric circle around view hole 38 is used.

Figure 7:
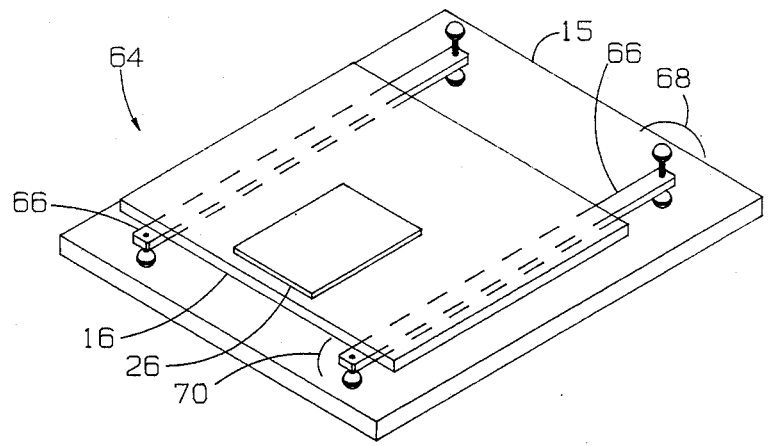
FIG. 7 is a prospective view of an easel alignment assembly designed in accordance with the present invention and serving as an additional alignment component of the alignment arrangement illustrated in FIG. 1.

As can be seen best in FIG. 1, in the embodiment shown there, easel 16 is supported directly onto baseboard 15. As a result, it is very difficult and, with most enlargers, impractical to adjust the easel itself or the baseboard in order to properly align easel plane 18 with negative plane 20 and/or lens plane 24. In order to make it possible to easily adjust the easel plane, the present invention provides for an overall easel adjustment assembly which is illustrated in FIG. 7 at 64. This arrangement includes a pair of rigid alignment bars 66, each of which includes position adjustment mechanisms 68 and 70 at opposite ends. These adjustment mechanisms will be described hereinafter. For the moment, it suffices to say that the adjust bars are intended to sit directly on baseboard 15 of enlarger apparatus 10 in spaced apart, parallel relationship to one another, as illustrated in FIG. 7. These adjustment bars support easel 16 on their upwardly facing surfaces and the easel, in turn, supports mirror member 26, as in FIG. 1.

Figure 8:
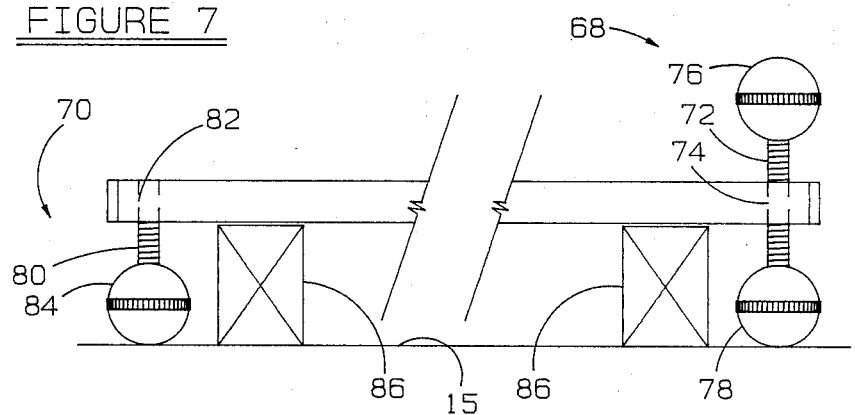
FIG. 8 is a side elevational view of one of two adjustment bars forming part of the easel adjustment assembly illustrated in FIG. 7.
Figure 9:
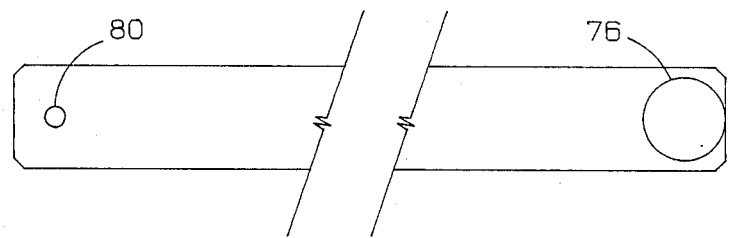
FIG. 9 is a top elevational view of the adjustment bar illustrated in FIG. 8.

Referring to FIGS. 8 and 9, one of the alignment bars is shown in side elevational view along with its adjustment mechanisms 68 and 70. As seen particularly in FIG. 8, the position adjustment mechanism 68 is comprised of a threaded shaft 72 which is thread mounted within a cooperating threaded opening 74 through one end of the alignment bar. Upper and lower adjustment knobs 76 and 78 are fixedly mounted to opposite ends of the threaded shaft 72. The adjustment mechanism 70 is similar to mechanism 68 to the extent that it includes a threaded shaft 80 disposed within a cooperating threaded opening 82 at the opposite end of the alignment bar and to the extent that it includes a bottom adjustment knob 84. However, as illustrated in FIG. 8, the threaded shaft 80 of adjustment mechanism 70 does not extend above the alignment bar, and it does not include an upper adjustment knob. Moreover, shaft 80 is fixed within its opening and knob 84 is thread mounted for vertical adjustment along shaft 80. Both alignment bars preferably include identical adjustment mechanisms 68 and 70.

With the two alignment bars supporting easel 16 and mirror member 26 on baseboard 15 in the manner shown, assuming that all of the lower adjustment knobs uniformly support the easel on the baseboard, it is merely a matter of selectively rotating specific knobs, either clockwise or counterclockwise, to selectively raise or lower specific ends or lengths of the alignment bars in order to adjust the position of the easel in the desired manner. By providing only two top knobs at common ends, an easel larger than the bars can extend over the other end.

In order to assure that all four lower adjustment knobs 78 and 80 do, indeed, uniformly support easel 16, the pair of support blocks 86 shown in dotted lines in FIG. 8 may be utilized to initially support the alignment bars on baseboard 15. As seen in FIG. 8, blocks 86 are equal in height and they are sufficiently large to initially support each alignment bar above baseboard 15 such that the lower knobs 78 and 84 do not touch the baseboard. Four such blocks would be provided, two for each alignment bar. They would be provided to initially support the two alignment bars in the position shown in FIG. 7 with the easel thereon and allow a single individual to make the necessary adjustments. Thereafter, the adjustment mechanisms 68 and 70 would be manipulated so that each of the lower adjustment knobs 78 and 84 below each alignment bar just touch baseboard 15. In this way, the blocks 86 can be removed so that the four lower adjustment knobs equally support easel 16 at the four corners defined by the ends of the alignment bars.

Once easel alignment assembly 64 is positioned on baseboard 15 in the manner described immediately above and is supporting easel 16 and mirror 26, the overall enlarger can be adjusted. Assuming the operator desires to align both the negative plane 20 and the lens plane 24, it is first necessary to make sure that these two planes are themselves parallel to one another, even if they are not initially parallel with the easel. This can be accomplished by utilizing the alignment arrangement described above. First, the two mirror members 26 and 28 would be used to determine the position of one of the planes, for example the negative plane 20, relative to the easel. No adjustment would be made, assuming that the negative plane is initially generally horizontal, although not necessarily perfectly parallel with the easel. In fact, for the purpose of this discussion, it will be assumed that the position of plane 20 causes the concentric circle around opening 38 to appear skewed, as in FIG. 2B. The next step is to adjust the other plane 24, for example the lens plane, so that it is parallel to the negative plane. This may be accomplished by utilizing the two mirror members and adjusting the position of the lens plane so that the concentric circle takes the same skewed configuration as the negative plane, that is, the skewed position illustrated in FIG. 2B. Once this is done, it can be assumed that the two planes 20 and 24 are, indeed, parallel with one another. Now it is only necessary to make sure that easel surface 18 is parallel with both the negative and lens planes. This can be accomplished by utilizing easel alignment assembly 64 in conjunction with the two mirror members in the manner described previously. Specifically, the operator may view through the top mirror member 28 at either negative plane 20 or lens plane 24 while adjusting the alignment bars 66 until the concentric circles appear in the mirror, as is illustrated in FIG. 2A. The easel is now parallel with the negative plane and the lens plane.

The foregoing description has related to enlarger apparatus which are typically verticle. It is to be understood that the present invention is contemplated for use with other apparatus such as process cameras, some of which extend horizontally or horizontally extending enlargers. Thus, where various components have been described herein as extending horizontally or vertically, the reverse is also contemplated. Of course, the use of easel alignment assembly 64 would not be practical for horizontal systems.

What is claimed:

1. An alignment arrangement for use with a photograph enlarger apparatus which includes an enlarger head assembly having a frame for supporting a negative to be enlarged and which also includes an enlarger easel and means for supporting said enlarger head assembly above said easel so that said negative support frame forming part of said enlarger head assembly can be adjustably positioned in parallel relationship with said easel, said alignment arrangement comprising:
   (a) a first mirror member having a mirror body including a mirrored surface, said first mirror member being configured to lie on said enlarger easel such that its mirrored surface faces said negative support frame;
   (b) means including a second mirror member having a mirror body including a mirrored surface and a view hole through its mirror body and mirrored surface, said means being configured to replace temporarily said negative support frame so that said second mirrored surface faces said easel and said first mirrored surface and so that both mirrored surfaces can be viewed through said view hole in said second mirror member; and
   (c) indicia on at least one of said mirrored surfaces such that when said mirrored surfaces are viewed through said view hole, said indicia will take only one of many different forms if the two mirrored surfaces are parallel, whereby said means including said second mirror member and/or said easel, and first mirror member can be adjusted to provide said one form in order to insure that said negative support frame is parallel with said easel.

2. An alignment arrangement according to claim 1 wherein said means including a second mirror member includes a transparent plate which is separate from said second mirror member and which supports said second mirror member thereon.

3. An alignment arrangement according to claim 1 wherein said means including a second mirror member includes an opaque plate having a through hole and which fixedly supports said second mirror member to its underside such that the view hole of said second mirror member is aligned with said first mirror member.

4. An alignment arrangement according to claim 1 wherein said indicia includes a circle on one of said mirrored surfaces and a dot at the center of said circle.

5. An alignment arrangement according to claim 4 wherein said circle is on said second mirrored surface disposed concentrically around said view hole which also serves as said dot.

6. An alignment arrangement according to claim 1 wherein said first and second mirrored surfaces extend horizontally with said second mirrored surface directly above said first mirrored surface, said arrangement including prism means configured to sit on said second mirrored surface directly over its view hole so that an individual can view said mirrored surfaces through said prism means and view hole.

7. An alignment arrangement according to claim 1 wherein said enlarger head assembly includes a lens which defines a lens plane over said easel, said arrangement including means for supporting said second mirror member in said lens plane with its mirrored surface facing said first mirrored surface so that both mirrored surfaces can be viewed through the view hole of said second mirror member, whereby said last-mentioned means and/or said easel can be adjusted using said indicia in order to insure that said lens plane is parallel with said easel.

8. An alignment arrangement according to claim 7 wherein said means for supporting said second mirror member in said lens plane includes a plate and means for maintaining said plate in said lens plane.

9. An alignment arrangement according to claim 8 wherein said plate maintaining means includes means for connecting the plate to said lens within said lens plane.

10. An alignment arrangement according to claim 9 wherein said connecting means includes cooperating adaptor and filter retaining rings.

11. An alignment arrangement according to claim 9 wherein said connecting means includes an adaptor ring and means for bonding said plate to said adaptor ring.

12. An alignment arrangement according to claim 7 wherein said enlarger head assembly includes a lens board for supporting said lens and wherein said plate maintaining means includes said lens board for temporarily supporting said plate in place of said lens.

13. An alignment arrangement according to claim 1 wherein said enlarger easel is a plate member separate and apart from the rest of the enlarger apparatus, said alignment arrangement including means for adjusting said easel in order to ensure that said negative support frame is parallel with said easel.

14. An arrangement according to claim 13 wherein said means for adjusting said easel includes a pair of alignment bars for supporting said easel on a baseboard below said enlarger head assembly, each of said alignment bars including first and second mechanisms located at opposite ends thereof for adjusting the opposite ends of the bar upward and downward on said baseboard.

15. An alignment arrangement according to claim 14 wherein the first adjustment mechanism on each alignment bar includes an upper adjustment knob above the alignment bar and a lower adjustment knob below the alignment bar and wherein the second adjustment mechanism of each alignment bar includes a lower adjustment knob, but not an upper adjustment knob.

16. An alignment arrangement for use with a photograph enlarger apparatus which includes an enlarger head assembly having a lens defining a lens plane and which also includes an enlarger easel below said lens plane and means for supporting said enlarger head assembly below said easel so that said lens plane can be adjustably positioned in parallel relationship with said easel, said alignment arrangement comprising:

(a) a first mirror member having a mirror body including a mirrored surface, said first mirror member being configured to lie on said enlarger easel such that its mirrored surface faces said lens plane;

(b) means including a second mirror member having a mirror body including a mirrored surface and a view hole through its mirror body and mirrored surface, said means being configured to place second mirror member in said lens plane so that said second mirrored surface faces said easel and said first mirrored surface and so that both mirrored surfaces can be viewed through said view hole in said second mirror member; and (c) indicia on at least one of said mirrored surfaces such that when said mirrored surfaces are viewed through said view hole, said indicia will take only one of many different forms if the two mirrored surfaces are parallel, whereby said means including said second mirror member and/or said easel, and first mirror member can be adjusted to provide said one form in order to insure that said lens plane is parallel with said easel.

17. An alignment arrangement according to claim 16 wherein said means including a second mirror member includes a transparent plate which is separate from said second mirror member and which supports said second mirror member thereon.

18. An alignment arrangement according to claim 16 wherein said means including a second mirror member includes an opaque plate having a through hole and which fixedly supports said second mirror member to its underside such that the view hole of said second mirror member is aligned with said through hole.

19. An alignment arrangement according to claim 16 wherein said indicia includes a circle on one of said mirrored surfaces and a dot at the center of said circle.

20. An alignment arrangement according to claim 16 wherein said circle is on said second mirrored surface disposed concentrically around said view hole which also serves as said dot.

21. An alignment arrangement according to claim 16 wherein said first and second mirrored surfaces extend horizontally with said second mirrored surface directly above said first mirrored surface, said arrangement including prism means configured to sit on said second mirrored surface directly over its view hole so that an individual can view said mirrored surfaces through said prism means and view hole.

22. An alignment arrangement according to claim 16 wherein said means for supporting said second mirror member in said lens plane includes a plate and means for maintaining said plate in said lens plane.

23. An alignment arrangement according to claim 22 wherein said plate maintaining means includes means for connecting the plate to said lens within said lens plane.

24. An alignment arrangement according to claim 23 wherein said connecting means includes cooperating adaptor and/or filter retaining rings.

25. An alignment arrangement according to claim 23 wherein said connecting means includes an adaptor ring and means for bonding said plate to said adaptor ring.

26. An alignment arrangement according to claim 22 wherein said enlarger head assembly includes a lens board for supporting said lens and wherein said plate maintaining means includes said lens board for temporarily supporting said plate in place of said lens.

27. An alignment arrangement according to claim 16 wherein said enlarger easel is a plate member separate and apart from the rest of the enlarger apparatus, said alignment arrangement including means for adjusting said easel in order to ensure that said negative support frame is parallel with said easel.

28. An arrangement according to claim 27 wherein said means for adjusting said easel includes the pair of alignment bars for supporting said easel on a baseboard below said enlarger head assembly, each of said alignment bars including first and second mechanisms located at opposite ends thereof for adjusting the opposite ends of the bar upward and downward on said baseboard.

29. An alignment arrangement according to claim 28 wherein the first adjustment mechanism on each alignment bar includes an upper adjustment knob above the alignment bar and a lower adjustment knob below the alignment bar and wherein the second adjustment mechanism of each alignment bar includes a lower adjustment knob, but not an upper adjustment knob.

30. In a photograph enlarger apparatus which includes an enlarger head assembly having a frame for supporting a negative to be enlarged and which also includes an enlarger easel and means for supporting said enlarger head assembly above said easel so that said negative support frame forming part of said enlarger head assembly can be adjustably positioned in parallel relationship with said easel, a method of aligning said frame and a negative supported thereby with said easel to insure that the negative and easel are parallel with one another, said method comprising the steps of:

(a) providing a first mirror member having a mirror body including a mirrored surface, and supporting said first mirror member on said enlarger easel such that its mirrored surface faces said negative support frame;

(b) providing a second mirror member having a mirror body including a mirrored surface and a view hole through its mirror body and mirrored surface, and replacing temporarily said negative support frame with means for holding said second mirror member in said negative plane so that said second mirrored surface faces said easel and said first mirrored surface and so that both mirrored surfaces can be viewed through said view hole in said second mirror member;

(c) providing indicia on at least one of said mirrored surfaces such that when said mirrored surfaces are viewed through said view hole, said indicia will take only one of many different forms if the two mirrored surfaces are parallel;

(d) while viewing said second mirrored surface through said view hole, adjusting the position of said negative frame and/or said easel until said indicia provides said one form, whereby to insure that the negative support frame is parallel with said easel; and (e) thereafter placing said negative frame back in its operating position.

31. A method according to claim 30 wherein said easel is adjusted while viewing said second mirrored surface through said view hole until said indicia takes said one form, said step of adjusting said easel including the steps of supporting said easel on a baseboard directly below said enlarger head on a pair of spaced apart alignment bars including mechanisms at each end of each bar for adjusting the position of that end on said baseboard.

32. A method according to claim 31 including the step of initially supporting each of said alignment bars on a pair of blocks which are of equal height and which are, in turn, supported on said baseboard and thereafter adjusting the position of each end of each alignment bar so that all of the ends just rest on the baseboard without the need of said blocks, and thereafter removing said blocks.

33. In a photograph enlarger apparatus which includes an enlarger head assembly having a lens defining a lens plane and which also includes an enlarger easel below said lens plane and means for supporting said enlarger head assembly above said easel so that said lens plane can be adjustably positioned in parallel relationship with said easel, a method of aligning said lens plane with said easel to insure that the lens plane and easel are parallel to one another, said method comprising the steps of:
 (a) providing a first mirror member having a mirror body including a mirrored surface, and supporting said first mirror member on said enlarger easel such that its mirrored surface faces said lens plane;
 (b) providing a second mirror member having a mirror body including a mirrored surface and a view hole through its mirror body and mirrored surface, and supporting said second mirror member in said lens plane so that said second mirrored surface faces said easel and said first mirrored surface and so that both mirrored surfaces can be viewed through said view hole in said second mirror member;
 (c) providing indicia on at least one of said mirrored surfaces such that when said mirrored surfaces are viewed through said view hole, said indicia will take only one of many different forms if the two mirrored surfaces are parallel; and
 (d) while viewing said second mirrored surface through said view hole, adjusting the position of said lens plane and/or said easel, until said indicia provides said one form, whereby to insure that the lens plane is parallel with said easel.

34. A method according to claim 33 wherein said easel is adjusted while viewing said second mirrored surface through said view hole until said indicia takes said one form, said step of adjusting said easel including the steps of supporting said easel on a baseboard directly below said enlarger head on a pair of spaced apart alignment bars including mechanisms at each end of each bar for adjusting the position of that end on said baseboard.

35. A method according to claim 34 including the step of initially supporting each of said alignment bars on a pair of blocks which are of equal height and which are, in turn, supported on said baseboard and thereafter adjusting the position of each end of each alignment bar so that all of the ends just rest on the baseboard without the need of said blocks, and thereafter removing said blocks.

36. In a photographic enlarger apparatus having an enlarger head assembly and including an easel located in a planar position on a baseboard directly below said enlarger head assembly, an assembly for adjusting the planar position of said easel, comprising:
 (a) first and second adjustment bars having opposite ends and being adapted to fit on said baseboard directly below said enlarger head assembly, said bars being located under and serving to support the easel; and
 (b) means for independently adjusting the position of each end of each of said alignment bars, both upward and downward to a limited extent, with respect to said baseboard whereby to adjust the planar position of said easel.

37. An assembly according to claim 36 wherein said position adjustment means include a bottom adjustment knob located below each end of each of said alignment bars.

38. An assembly according to claim 37 wherein said adjustment includes a top adjustment knob at one end of and above an adjacent bottom knob of each or said alignment bars.

39. An assembly according to claim 38 wherein said adjustment means include a threaded shaft through a cooperating threaded opening through each end or each of said bars, wherein each of said top adjustment knobs and their adjacent bottom knobs are fixedly mounted to a cooperating one of said threaded shafts and wherein each of the other bottom knobs is thread mounted to one of the shafts for vertical adjustment along the latter shaft.

40. An assembly according to claim 39 including block means for initially supporting each of said alignment bars on said baseboard.

41. In a photographic enlarger apparatus having an enlarger head assembly and including an easel located in a planar position on a baseboard directly below said enlarger head assembly, an assembly for adjusting the planar position of said easel, comprising:
 (a) first and second adjustment bars having opposite ends and being adapted to fit on said baseboard directly below said enlarger head assembly, said bars serving to support the easel; and
 (b) means for adjusting the position of at least one end of each of said alignment bars, both upward and downward to a limited extent, with respect to said baseboard whereby to adjust the planar position of said easel.

* * * * *